United States Patent
Pfohl et al.

(10) Patent No.: US 7,633,021 B2
(45) Date of Patent: Dec. 15, 2009

(54) CYCLE COUNTER FOR A LOADER

(75) Inventors: Kevin L. Pfohl, Potosi, WI (US); Gary S. Honey, Dubuque, IA (US); Erin E. Ralph, Dubuque, IA (US); Douglas Meyer, Dubuque, IA (US)

(73) Assignee: Deere & Company, Moline, IL (US)

( * ) Notice: Subject to any disclaimer, the term of this patent is extended or adjusted under 35 U.S.C. 154(b) by 80 days.

(21) Appl. No.: 11/872,467

(22) Filed: Oct. 15, 2007

(65) Prior Publication Data

US 2009/0095539 A1 Apr. 16, 2009

(51) Int. Cl.
*G01G 19/08* (2006.01)

(52) U.S. Cl. .................. 177/141; 701/50; 702/174

(58) Field of Classification Search .................. 701/50; 702/174; 177/136–139, 141
See application file for complete search history.

(56) References Cited

U.S. PATENT DOCUMENTS

| | | | | |
|---|---|---|---|---|
| 4,230,196 A | * | 10/1980 | Snead | 177/141 |
| 4,635,739 A | * | 1/1987 | Foley et al. | 177/45 |
| 4,835,719 A | * | 5/1989 | Sorrells | 702/174 |
| 4,921,578 A | * | 5/1990 | Shiraishi et al. | 177/25.19 |
| 4,949,263 A | * | 8/1990 | Jurca | 701/50 |
| 4,995,468 A | * | 2/1991 | Fukuda | 177/139 |
| 5,067,572 A | * | 11/1991 | Kyrtsos et al. | 177/139 |
| 5,105,895 A | * | 4/1992 | Kyrtsos | 177/25.14 |
| 5,220,968 A | * | 6/1993 | Weber | 177/25.14 |
| 5,955,706 A | * | 9/1999 | Fonkalsrud et al. | 177/136 |
| 5,995,888 A | * | 11/1999 | Hagenbuch | 701/35 |

* cited by examiner

*Primary Examiner*—Randy W Gibson
(74) *Attorney, Agent, or Firm*—Taylor & Aust, P.C.

(57) ABSTRACT

A cycle counter system for use with a loading machine having a loading bucket. The cycle counter system includes at least one weight sensor, an operator activated control and a processing circuit. The at least one weight sensor produces a weight signal relating to a measured weight of a weight lifted by the loading machine. The operator activated control in the loading machine selectively produces at least one control signal. The processing circuit receives the control signal and the weight signal. The measured weight is added to a selected of a plurality of weight values dependent on the at least one control signal.

17 Claims, 5 Drawing Sheets

CYCLE COUNTER FOR A LOADER

FIELD OF THE INVENTION

This invention relates to a cycle counter, and more particularly to a cycle counter system for a loading system of a ground engaging vehicle.

BACKGROUND OF THE INVENTION

In a typical aggregate operation there are multiple grades of aggregate that are loaded upon trucks with a loader. A loader is typically the first point in which a product is loaded into a truck and affords an opportunity for the tracking of inventory at the point of delivery of the aggregate to a truck.

When attempting to keep track of the number of full truck loads or buckets of material provided to a hopper, a truck or a stock pile, a loader operator typically uses several mechanical palm counters in the cab of the vehicle with each representing a type of aggregate that is moved. These palm counters are typically mounted in the structure of the cab and are manually marked and selected for each aggregate. Loaders that are equipped with a weighing system also utilize a "remote add" switch to add the weight in the bucket to a truck total and then a "remote clear" switch to reset the truck weight value. For example, the loader operator moves three different aggregates per day. It is the responsibility of the operator to keep track of the number of trucks filled with each of the three aggregates. To keep track of each aggregate and the number of trucks filled, the operator places three palm counters in the cab labeled as counter 1, 2 and 3, corresponding to the three types of aggregate. When the operator fills a bucket, the weighing system will request that the weight in the bucket be added to the truck and the operator presses the remote add button to add the total. This is done with every bucket load. When the truck with aggregate 1 is full, the operator presses the "remote clear" button to zero out the truck weight. In addition, the operator will then increment the palm counter labeled 1 by one count.

What is needed in the art is an apparatus that will allow a loader operator to be more efficient and reduce errors associated with the counting of loads.

SUMMARY OF THE INVENTION

The invention, in one form thereof, is directed to a cycle counter system for use with a loading machine having a loading bucket. The cycle counter system includes at least one weight sensor, an operator activated control and a processing circuit. The at least one weight sensor produces a weight signal relating to a measured weight of a weight lifted by the loading machine. The operator activated control in the loading machine selectively produces at least one control signal. The processing circuit receives the control signal and the weight signal. The measured weight is added to a selected of a plurality of weight values dependent on the at least one control signal.

DETAILED DESCRIPTION OF THE INVENTION

Figure 1:
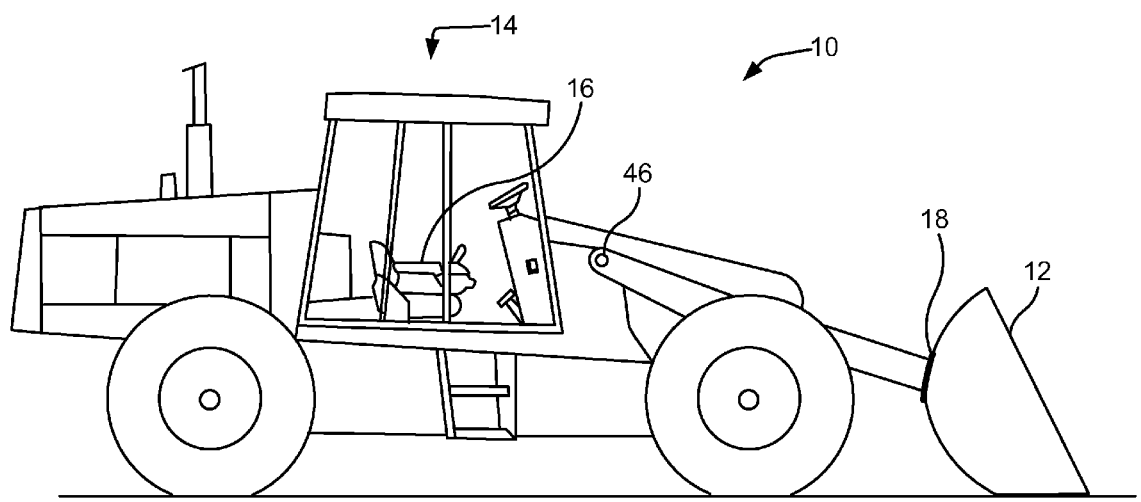
FIG. 1 is a schematicized side view of a loader utilizing an embodiment of the cycle counter system of the present invention.
Figure 2:
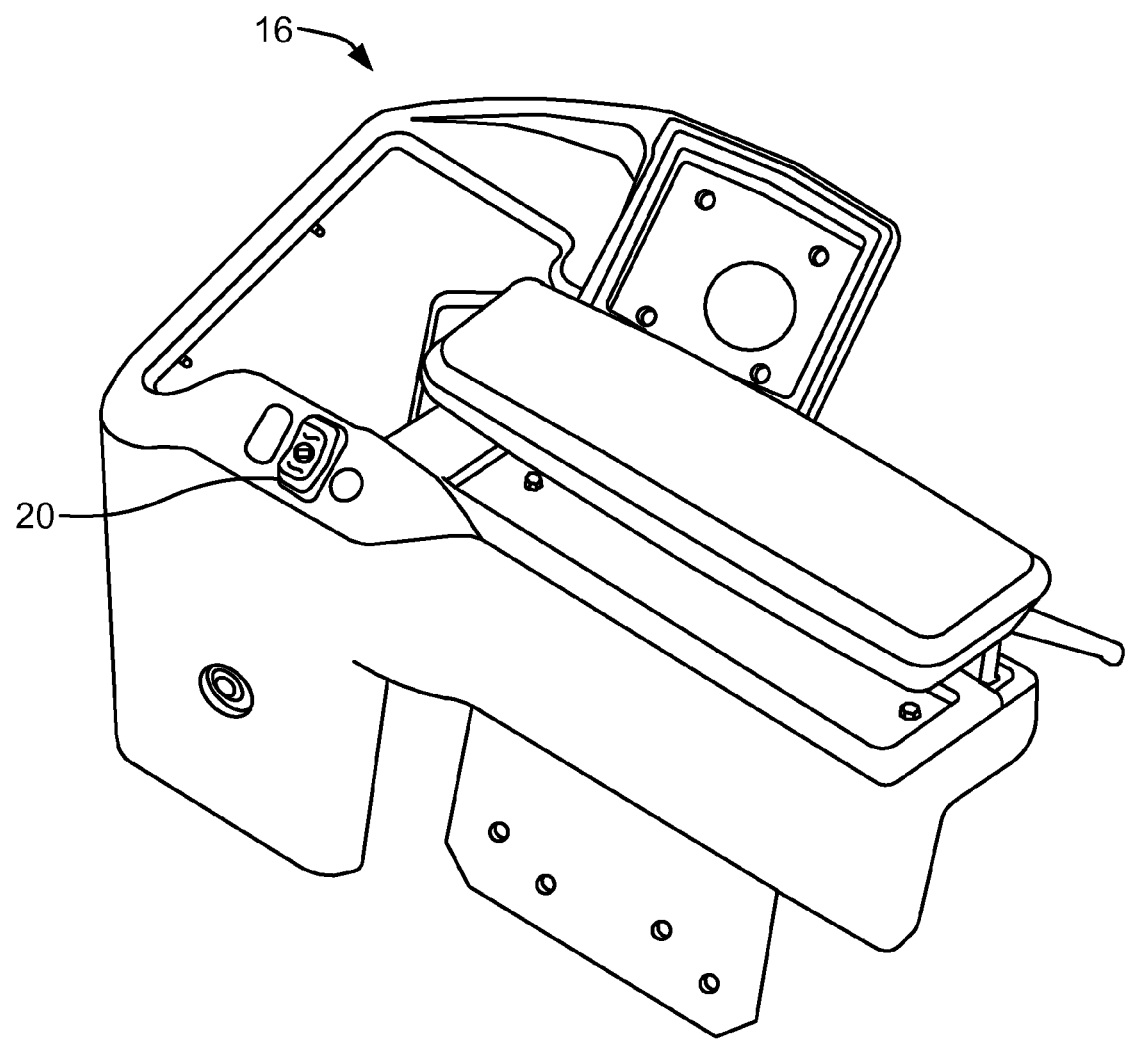
FIG. 2 is a perspective view of a consol in the cab of the loader of FIG. 1 having a cycle counter switch of the present invention.
Figure 3:
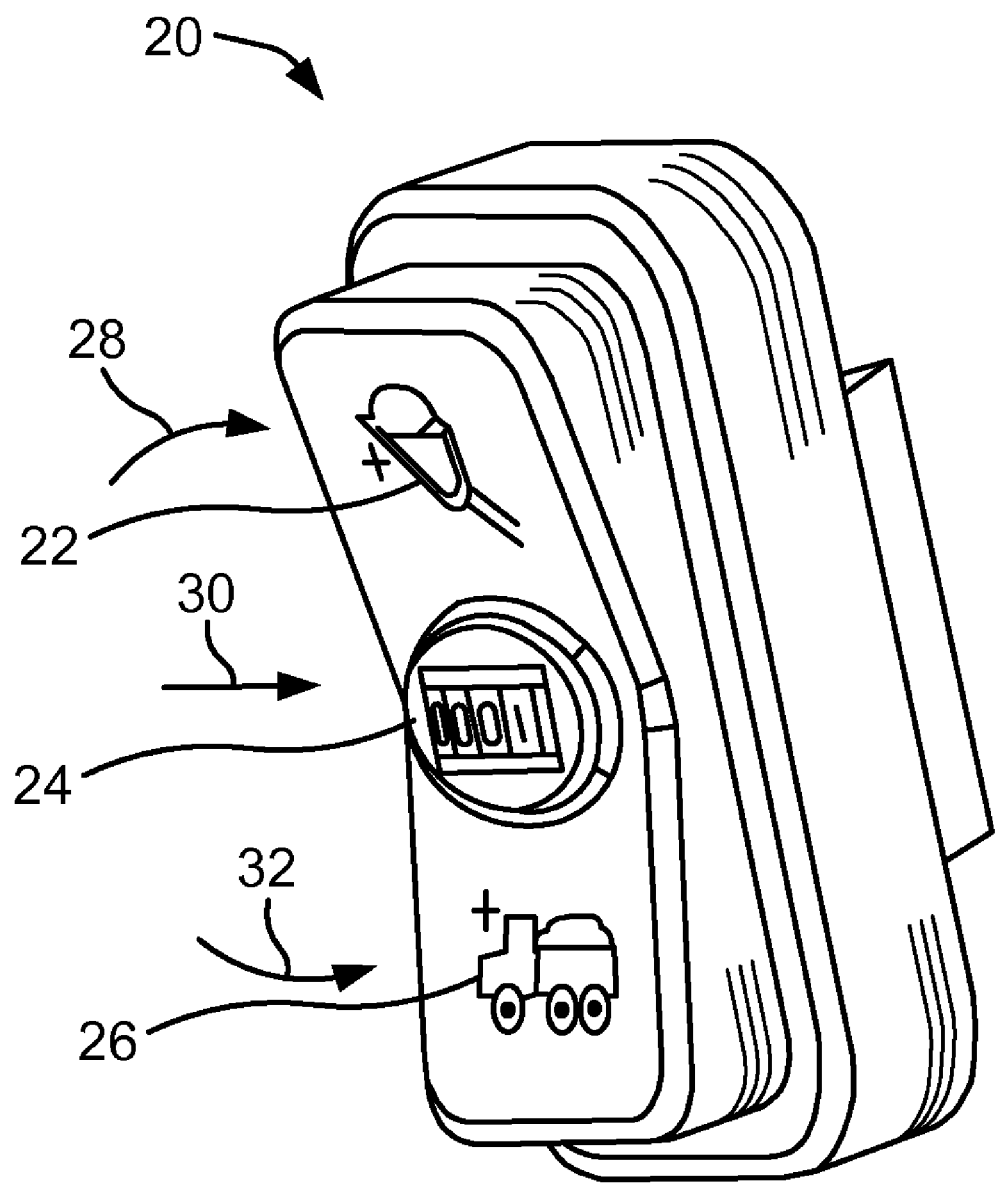
FIG. 3 is an illustration of the cycle counter switch mounted on the consol of FIG. 2 located in the loader of FIG. 1.
Figure 4:
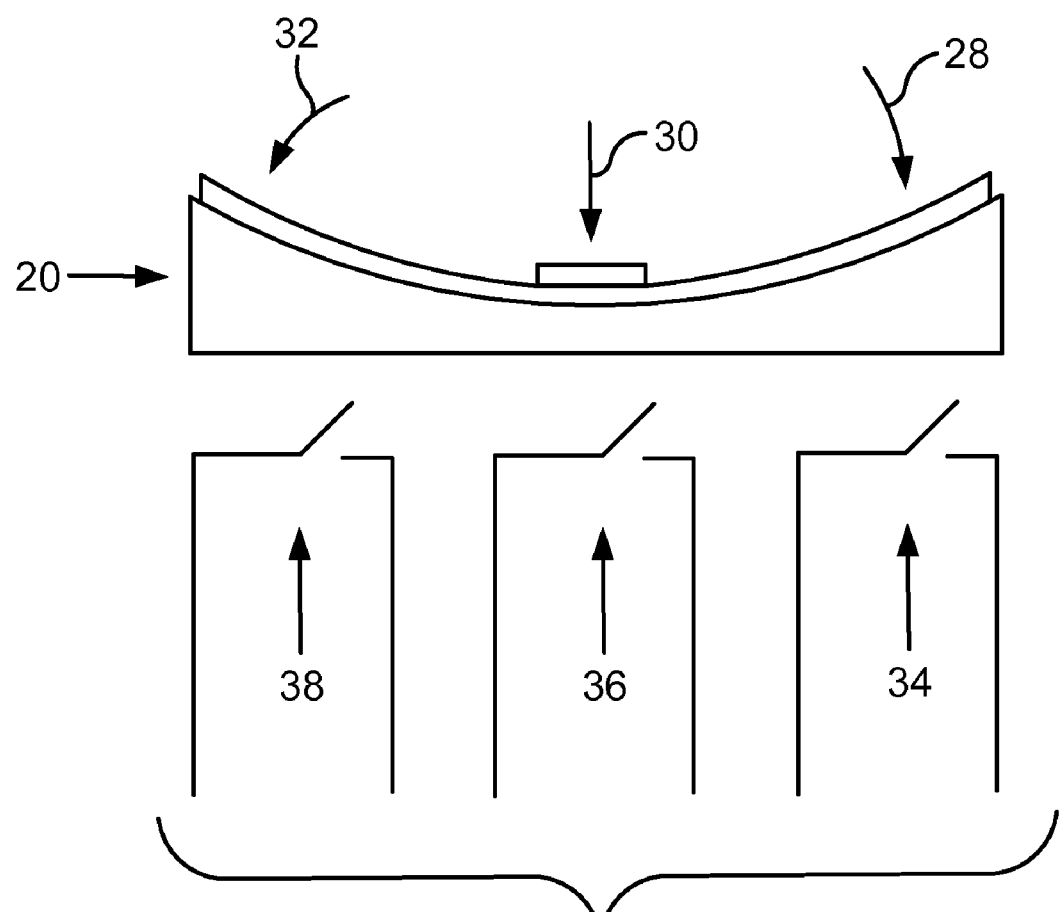
FIG. 4 is a schematicized view of the cycle counter of FIG. 3.
Figure 5:
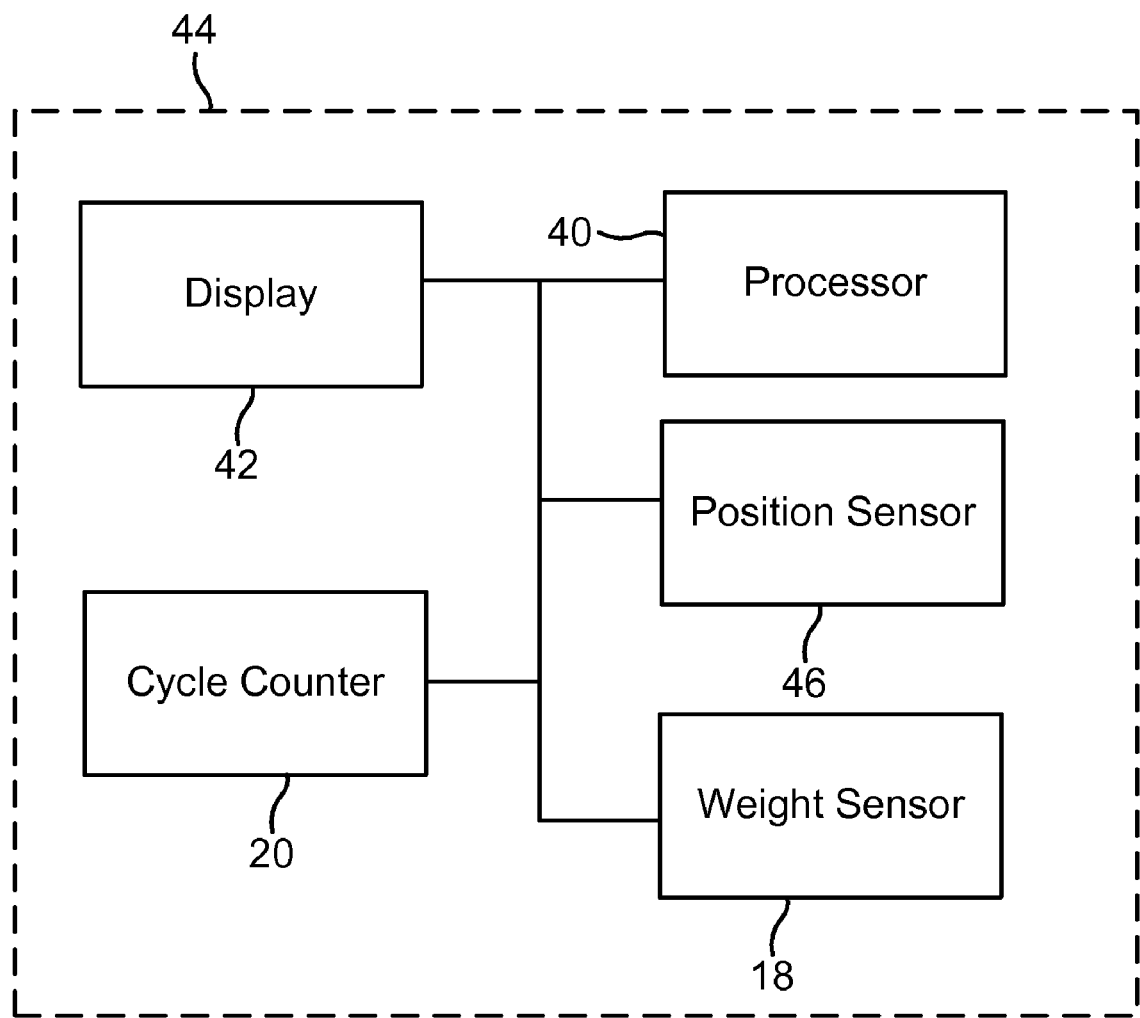
FIG. 5 is a block diagram including elements of the cycle counter system of FIGS. 1-4.

Referring now to the drawings, and more particularly to FIG. 1, there is shown a ground engaging vehicle 10, which may be in the form of a loader 10. Loader 10 includes a bucket 12, and a cab 14 having a consol 16 therein. Loader 10 includes hydraulic systems for the lifting of bucket 12 and a load therein. Cab 14 includes operator activated controls, which may be associated with consol 16. One operator activated control is the cycle counter system of the present invention. Associated with bucket 12 and/or the loading mechanism connected thereto are weight sensors 18 that provide weight information relative to the load in bucket 12.

Now, additionally referring to FIGS. 2-5 there is shown a button/switch 20 also known as a cycle counter 20 mounted in consol 16. Cycle counter 20 includes a bucket icon 22, a counter icon 24, and a truck icon 26. Cycle counter switch 20 is operated in one of three directions including direction 28, 30 and 32. Moving cycle counter switch in direction 28 activates switch 34, which results in a signal associated with the depressing of bucket icon 22. In a like manner operation of cycle counter switch 20 in direction 30 indicates a counter icon 24 selection. And in a similar manner the activation of cycle counter 20 in direction 32 indicates a selection of truck icon 26. By activating cycle counter switch 20 in direction 28 causes switch 34 to close. And in a like manner switch 36 and 38 are activated when cycle counter switch 20 is moved in directions 30 and 32, respectively. Although not shown, cycle counter switch 20 includes biasing members that prevent the activation of switches 34, 36 and 38 unless cycle counter switch 20 is depressed in one of directions 28, 30 or 32.

A processor 40 communicates with a display 42 as well as cycle counter switch 20 and weight sensors 18. Processor 40 displays information relative to cycle counter system 44, reads input from cycle counter switch 20 and weight information from weight sensors 18. Processor 40 adds weight to stored weight values that are associated with the truck and/or the counter select, to account for the type of aggregate put in each truck and the amount of the aggregate loaded.

Display 42 provides information to the operator relative to various operating conditions of loader 10, which can include such things as oil pressure, engine coolant temperature, engine rpm, ground speed and other elements relative to loader 10. In addition display 42 indicates the counter that is selected currently by cycle counter system 44, the weight present in bucket 12 and operating modes of cycle counter system 44. The number of cycle counters is programmable by way of a setup method and for ease of illustration it will be considered that five counters are selected, which will correspond to five product types or aggregates that are being loaded by loader 10. Additionally, alphanumeric representations of aggregates can be entered and those alphanumeric representations can be displayed on display 42. Cycle counter switch 20 is connected to the vehicle controller, represented herein by processor 40.

Cycle counter system 44 provides functionality to cycle counter switch 20 in that when cycle counter switch 20 is moved in direction 28, thereby selecting bucket icon 22 the button selection results in at least three different functions depending upon the amount of time that cycle counter 20 is activated in direction 28. A momentary press of cycle counter switch 20 on bucket icon 22 in direction 28 causes the bucket weight sensed by weight sensors 18 to be added to a running truck total weight. The total truck weight will usually be some number of loads from bucket 12 in order to adequately load the truck with the aggregate. If button icon 22 is depressed, and held for at least a predetermined time, while bucket 12 is on the ground, or proximate to the ground, cycle counter system 44 will zero the weight in the bucket, allowing cycle counter system 44 to provide a tare weight when an aggregate is loaded into bucket 12.

When bucket icon 22 is depressed and held when bucket 12 is an elevated position with a load therein this activates a "tip off" mode. While normally emptying an entire bucket into the truck simply adds the weight of the aggregate that was loaded into the bucket to the truck total, in a "tip off" mode it can be considered that the truck is nearly filled and that only some additional weight will be added from an aggregate held in bucket 12. The "tip off" mode causes the weight difference from the loaded bucket 12 and the weight after removing some aggregate from bucket 12 to be added to the weight value for the truck, thereby topping off the load of the truck. In the "tip off" mode while other weights have been added based on the aggregate lifted in the bucket the tip off weight added to the weight value associated with the truck is the difference between the filled bucket and the partially emptied bucket. If it turns out that the entire bucket is dumped into the truck then the "tip off" mode is equal to the "non-tip off" mode and the weight of the entire bucket is added to the weight associated with that particular truck. The aggregate remaining in bucket 12 can be dumped into another truck and the remaining weight is added to the weight value associated with the subsequent truck.

Depressing cycle counter switch 20 in direction 30 selects counter icon 24 and activates switch 36 resulting in a signal thereby causing the counter to be cycled in display 42 and processor 40 then accumulates data relative to the selected aggregate or load product. As previously indicated display 42 can also display alpha numeric codes or description of the product. These representations allow the operator to know which of the aggregates and/or products is being recorded by processor 40 relative to a truck load during operation. If counter icon 24 is depressed multiple times the counter selection is simply cycled until the one desired by the operator is displayed. As previously indicated with a selection of five aggregates the multiple depressing of counter icon 24 will cause the counter select to cycle from 1 to 2 to 3 to 4 to 5 and then back to 1 in a cyclical manner.

When cycle counter switch 20 is moved in direction 32 thereby selecting add truck icon 26 and causing switch 38 to close resulting in a signal sent to processor 40, this can result in at least two different operations. The momentary pressing of truck icon 26 causes the truck counter to increment and clears the total truck weight so that subsequent adding of weight to a weight value, as discussed above, will then track the amount of aggregate placed in the truck. If add truck icon 26 is depressed and held for more than a predetermined time then the truck weight and information will be reset. For example, if the operator has incorrectly loaded an aggregate number 2 and aggregate number 1 was the correct aggregate then the operator, by holding add truck button for more than the predetermined time, will reset the weight value associated with that truck, thereby allowing the truck to empty aggregate number 2 and the correct aggregate can be added by the operator.

The predetermined time for holding a button down may be a short time, such as two seconds, three seconds or even longer such as five seconds. The operator receives visual feedback on display 42 indicating that cycle counter system 44 has accepted the operator input as entered on cycle counter switch 20. Cycle counter switch 20 may be physically constructed to allow the activation of more than one switch 34, 36 and 38. Cycle counter system 44 will interpret the cycle counter switch 20's depressing as the first switch closed being the one desired by the operator. Cycle counter system 44 thereby prevents various inputs that may otherwise occur.

The present invention has various advantages including elimination of cycle palm counters mounted in the cab of the loader. The system is intuitive and the operator can quickly adapt to the use of cycle counter system 44 and it combines weighing and cycle counter functions to reduce fatigue of the operator in the operation of loader 10. Accumulation of the data by cycle counter system 44 may also be transmitted to another processing system apart from loader 10 in order to automatically process billing information and control inventory related to sale of aggregate or other products being weighed in this manner.

The operator activated control 20 produces signals by way of closing of switches 34, 36 and 38 that are processed by processor 40 and makes use of other elements of loader 10 including a position sensor 46 that measures the position of bucket 12 relative to loader 10.

Having described the preferred embodiment, it will become apparent that various modifications can be made without departing from the scope of the invention as defined in the accompanying claims.

The invention claimed is:

1. A cycle counter system for use with a loading machine having a loading bucket, said system comprising:
    at least one weight sensor that produces a weight signal relating to a measured weight of a weight lifted by the loading machine;
    an operator activated control in the loading machine, said control selectively producing at least one control signal; and
    a processing circuit configured to receive said control signal and said weight signal, said processing circuit being further configured to add said measured weight to a selected one of a plurality of weight values dependent on said at least one control signal, said at least one control signal including an add bucket signal, a counter select signal, and an add truck signal.

2. The cycle counter system of claim 1, further comprising a position sensor producing a position signal representative of a position of the loading bucket.

3. The cycle counter of claim 2, wherein said processing circuit is further configured to zero said measured weight if said position signal indicates the loading bucket is proximate the ground and said add bucket signal is sent by said operator activated control for more than a predetermined time.

4. The cycle counter of claim 2, wherein said processing circuit is further configured to activate a tip-off mode if said position signal indicates the loading bucket is above a predetermined height above the ground and said add bucket signal is sent by said operator activated control for more than a predetermined time.

5. The cycle counter system of claim 1, wherein said processing circuit is further configured to alter a pointer value representative of a counter dependent upon a momentary receipt of said counter select signal.

6. The cycle counter system of claim 1, wherein said processing circuit is further configured to increment a truck counter dependent upon a momentary receipt of said add truck signal.

7. The cycle counter system of claim 6, wherein said processing circuit is further configured to clear a total weight value associated with said truck counter.

8. The cycle counter system of claim 1, wherein said processing circuit is further configured to reset values associated with said truck counter dependent upon said add truck signal lasting more than a predetermined amount of time.

9. A loading machine, comprising:
a ground engaging vehicle having a loading device; and
a cycle counter system operatively connected to the loading machine, said system including:
at least one weight sensor that produces a weight signal relating to a measured weight of a weight lifted by the loading machine;
an operator activated control in the loading machine, said control selectively producing at least one control signal; and
a processing circuit configured to receive said control signal and said weight signal, said processing circuit being further configured to add said measured weight to a selected one of a plurality of weight values dependent on said at least one control signal, said at least one control signal including an add bucket signal, a counter select signal, and an add truck signal.

10. The loading machine of claim 9, further comprising a position sensor producing a position signal representative of a position of the loading device.

11. The cycle counter of claim 10, wherein said processing circuit is further configured to zero said measured weight if said position signal indicates the loading device is proximate the ground and said add bucket signal is sent by said operator activated control for more than a predetermined time.

12. The cycle counter of claim 10, wherein said processing circuit is further configured to activate a tip-off mode if said position signal indicates the loading device is above a predetermined height above the ground and said add bucket signal is sent by said operator activated control for more than a predetermined time.

13. The loading machine of claim 9, wherein said processing circuit is further configured to alter a pointer value representative of a counter dependent upon a momentary receipt of said counter select signal.

14. The loading machine of claim 9, wherein said processing circuit is further configured to increment a truck counter dependent upon a momentary receipt of said add truck signal.

15. The loading machine of claim 14, wherein said processing circuit is further configured to clear a total weight value associated with said truck counter.

16. The loading machine of claim 9, wherein said processing circuit is further configured to reset values associated with said truck counter dependent upon said add truck signal lasting at least a predetermined amount of time.

17. The loading machine of claim 16, wherein said predetermined time is two seconds.

* * * * *